US007024337B2

(12) United States Patent
Yoda

(10) Patent No.: US 7,024,337 B2
(45) Date of Patent: Apr. 4, 2006

(54) SYSTEM AND METHOD FOR ANALYZING NOISE

(75) Inventor: Tomoyuki Yoda, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 77 days.

(21) Appl. No.: 10/797,130

(22) Filed: Mar. 11, 2004

(65) Prior Publication Data

US 2005/0005199 A1    Jan. 6, 2005

(30) Foreign Application Priority Data

Jun. 20, 2003    (JP)    ............................ P2003-176643

(51) Int. Cl.
*G06F 11/08*    (2006.01)

(52) U.S. Cl. .......................................... 702/183; 716/4

(58) Field of Classification Search .................. 702/17, 702/35, 57–59, 65, 66, 71, 74, 79, 80, 81, 702/82, 90, 111, 112, 124, 182, 183–185, 702/189, 191, 193, 195; 716/4, 5; 703/15
See application file for complete search history.

(56) References Cited

U.S. PATENT DOCUMENTS

| | | | | | |
|---|---|---|---|---|---|
| 5,481,695 A | * | 1/1996 | Purks | ........................... | 703/15 |
| 6,378,109 B1 | * | 4/2002 | Young et al. | ................... | 716/4 |
| 6,499,131 B1 | * | 12/2002 | Savithri et al. | ................. | 716/5 |
| 6,591,402 B1 | * | 7/2003 | Chandra et al. | ............... | 716/5 |
| 6,665,845 B1 | * | 12/2003 | Aingaran et al. | .............. | 716/5 |
| 2003/0079191 A1 | * | 4/2003 | Savithri et al. | ................. | 716/4 |

FOREIGN PATENT DOCUMENTS

JP    5-342305    12/1993

* cited by examiner

*Primary Examiner*—Marc S. Hoff
*Assistant Examiner*—Mohamed Charioui
(74) *Attorney, Agent, or Firm*—Oblon, Spivak, McClelland, Maier & Neustadt, P.C.

(57) ABSTRACT

A system and method for analyzing noise includes an error information storage unit storing threshold values of malfunction factors that create a malfunction of a victim receiver cell due to a noise, an error criterion generation section which selects the threshold values from the error information storage unit, and generates an error criterion according to the victim receiver cell by plotting the threshold values and conducting the threshold values smooth processing on, a noise analysis section configured to measure the malfunction factors, and a comparison section configured to compare the measured malfunction factors to the error criterion, and to judge whether the noise will create a malfunction of the victim receiver cell when the malfunction factors meet the error criterion.

16 Claims, 16 Drawing Sheets

SYSTEM AND METHOD FOR ANALYZING NOISE

CROSS REFERENCE TO RELATED APPLICATIONS

This application is based upon and claims the benefit of priority from the prior Japanese Patent Applications No. P2003-176643, filed on Jun. 20, 2003; the entire contents of which are incorporated herein by reference.

BACKGROUND OF THE INVENTION

1. Field of the Invention

The present invention relates to technology for analyzing noise of an integrated circuit by use of a computer, and specifically relates to a noise analysis system and a noise analysis method to analyze crosstalk noise generated in wires of the integrated circuit.

2. Description of the Related Art

In an integrated circuit, since a transistor with low output impedance has a large driving capability, the waveform of a signal transmitted from such a transistor tends to generate significant crosstalk noise in a signal propagated through an adjacent wire. On the contrary, since a transistor with high output impedance has a low driving capability, the waveform of a signal transmitted from such a transistor is subject to the influence of crosstalk noise. With increased integrated circuit density, the crosstalk noise, which causes a malfunction of a logic circuit, has been a significant problem.

In a conventional crosstalk noise analysis method, a criterion for judging or determining generation of crosstalk noise is whether the crosstalk noise inverts the logic of a receiver cell in a state where a constant signal (high or low signal) is being propagated (hereinafter, referred to as "a static state") through a wire.

However, the conventional crosstalk noise analysis method does not take into consideration the influence of crosstalk noise in a state where a rising or falling signal is being propagated (hereinafter, referred to as "a transition state"). In some cases, crosstalk noise does not cause a malfunction of the receiver cell in the static state while crosstalk noise is generated in a rising or falling signal propagated through the wire and causes a malfunction of the receiver cell in the transition state. Therefore, the conventional crosstalk noise analysis method cannot completely prevent a malfunction of the receiver cell. In this specification, the "rising signal" and "falling signal" is not limited to rising and falling sections of a rectangular wave signal such as the leading and trailing edges of a clock pulse, but also represent the rising and falling signals propagating in wires, respectively.

It is also possible to equally estimate the influence of crosstalk noise in the transition state using the crosstalk noise in the static state as the criterion to change the design. However, such design change leads to a large circuit design, thus increasing the circuit area and power dissipation and reducing speed of the circuit.

SUMMARY OF THE INVENTION

An aspect of the present invention inheres in a system for analyzing noise including an error information storage unit storing threshold values of malfunction factors that create a malfunction of a victim receiver cell due to a noise, an error criterion generation section which selects the threshold values from the error information storage unit and generates an error criterion according to the victim receiver cell by plotting the threshold values and conducting the threshold values smooth processing on, a noise analysis section configured to measure the malfunction factors and a comparison section configured to compare the measured malfunction factors to the error criterion, and to judge whether the noise will create a malfunction of the victim receiver cell when the malfunction factors meet the error criterion.

Another aspect of the present invention inheres in a computer implemented method for analyzing noise including generating an error criterion according to the victim receiver cell by plotting the threshold values and conducting the threshold values to smooth processing on, measuring the malfunction factors, comparing the measured malfunction factors to the error criterion and judging whether the noise creates a malfunction of the victim receiver cell when the malfunction factors meet the error criterion.

DETAILED DESCRIPTION OF EMBODIMENTS

Figure 1:
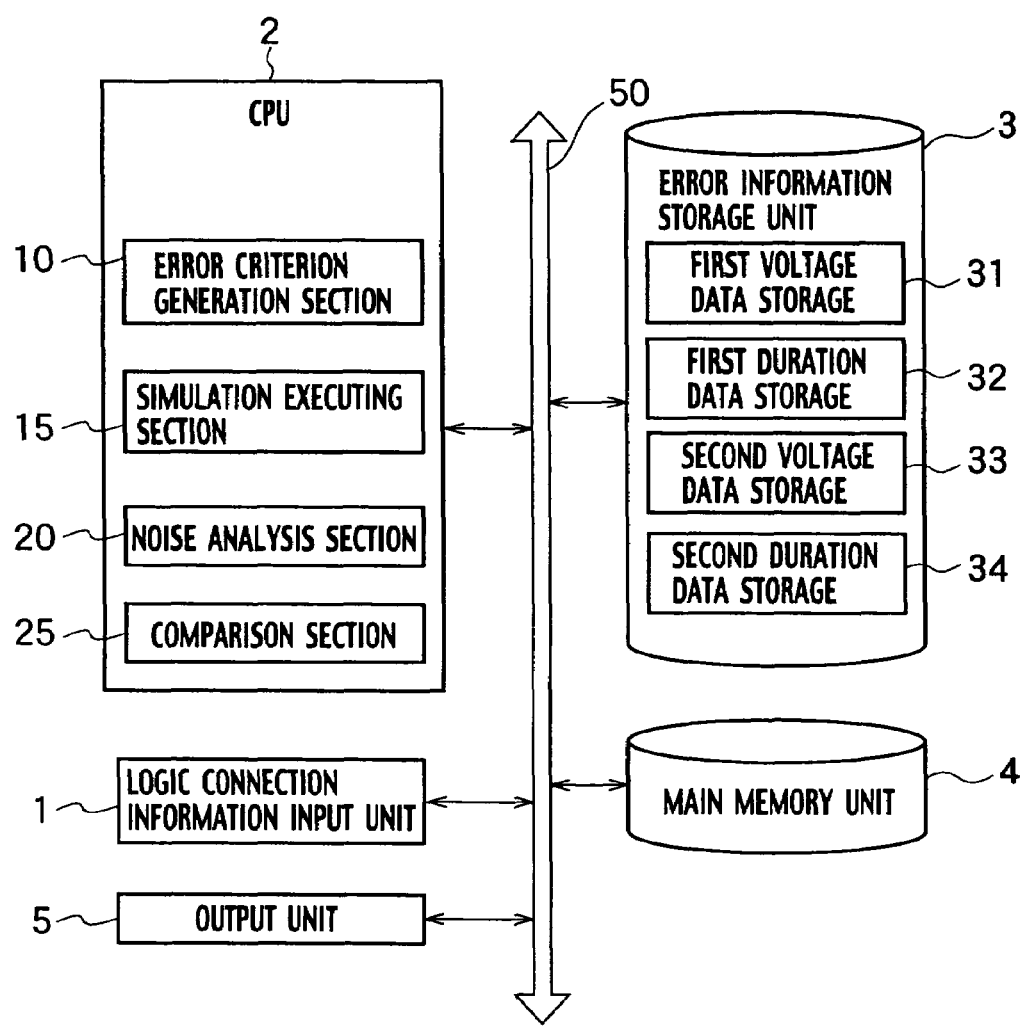
FIG. 1 is a view schematically showing a system for analyzing noise of a first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous specific details are set forth such as specific signal values, etc. to provide a thorough understanding of the present invention. However, it will be obvious to those skilled in the art that the present invention may be practiced without such specific details.

(First Embodiment)

As shown in FIG. 1, a crosstalk noise analysis system according to a first embodiment of the present invention includes a logic connection information input unit 1, a CPU 2, an error information storage unit 3, a main memory unit 4, and an output unit 5, which are connected to a bus 50. The CPU 2 includes an error criterion generation section 10, a simulation executing section 15, a noise analysis section 20, and a comparison section 25.

Figure 2:
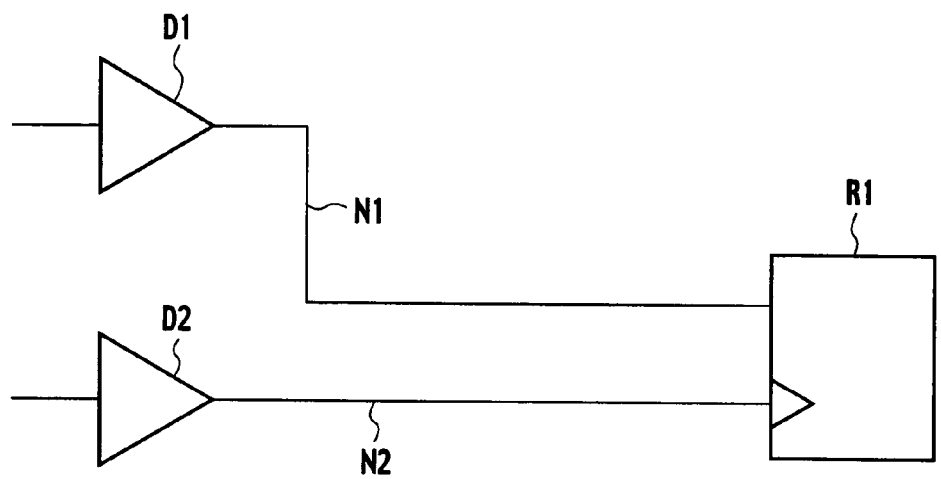
FIG. 2 is a view schematically showing the circuit wherein crosstalk noise is generated.

The logic connection information input unit 1 transmits data to the main memory 4 of a layout pattern of a logic circuit to be designed. For example, the logic connection information input unit 1 transmits data of a layout pattern of a logic circuit, which is composed of a receiver cell R1, a driver D2 which transmits a clock signal to the receiver cell R1 through a wire N2, a wire N1 adjacent to the wire N2, and a driver D1 which transmits a general signal through the wire N1 as shown in FIG. 2.

In this specification, the driver D1 which provides the influence of crosstalk noise is defined as an "aggressor wire driver," the driver D2 which receives the influence of crosstalk noise is a "victim wire driver," the wire N1 which provides the influence of crosstalk noise is an "aggressor wire," the wire N2 which receives the influence of crosstalk noise is a "victim wire," and the receiver cell R1 which receives the influence of crosstalk noise is a "victim receiver cell."

The error information storage unit 3 stores a plurality of error information. The "a plurality of error information" are threshold values of "malfunction factors," which cause a malfunction of the victim receiver cell due to the crosstalk noise. The "error information," which is measured by a circuit simulation or an actual measurement, is stored in the error information storage unit 3. In the crosstalk noise analysis system according to the first embodiment of the present invention, as shown in FIG. 1, noise voltage in a rising signal is stored in a first voltage data storage 31, noise duration in a rising signal is stored in a first duration data storage 32, noise voltage in a falling signal is stored in a second voltage data storage 33, and noise duration in a falling signal is stored in a second duration data storage 34.

Figure 3:
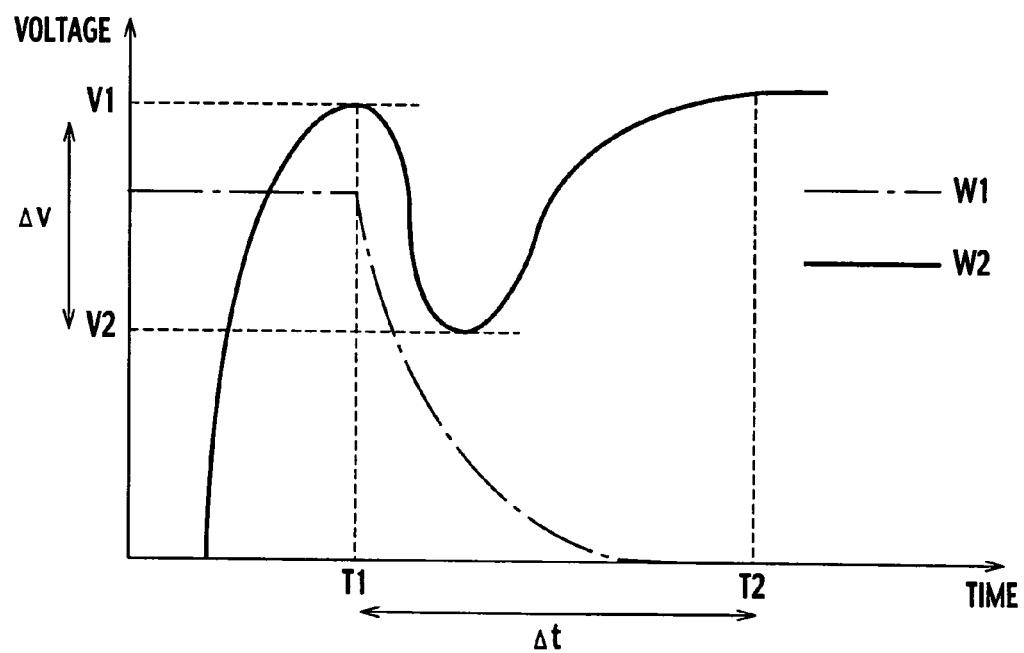
FIG. 3 is a waveform chart schematically showing crosstalk noise generated in a rising signal.

The "noise voltage in a rising signal" is voltage of crosstalk noise generated in the rising signal propagated through a wire and causes a malfunction of the victim receiver cell. For example, as shown in FIG. 3, with the falling of a signal W1 at a time T1 in the wire N1 of FIG. 2, crosstalk noise is generated in the rising signal W2 propagated through the wire N2 of FIG. 2, and voltage ($\Delta v = V2 - V1$) of the crosstalk noise causes a malfunction of the receiver cell R1 of FIG. 2. In this case, the "noise voltage in a rising signal ($\Delta v$)" is stored in the first voltage data storage 31 as the error information.

The "noise duration in a rising signal" is the duration of crosstalk noise generated in the rising signal propagated through a wire which causes a malfunction of the victim receiver cell. For example, as shown in FIG. 3, with the falling of the signal W1 in the wire N1 of FIG. 2 during the period of the time T1 to the time T2, the crosstalk noise is generated in the rising signal W2 propagated through the wire N2, and duration ($\Delta t = T2 - T1$) of the crosstalk noise causes a malfunction of the receiver cell R1. In this case, the "noise duration in a rising signal ($\Delta t$)" is stored in the first duration data storage 32 as the error information.

Figure 4:
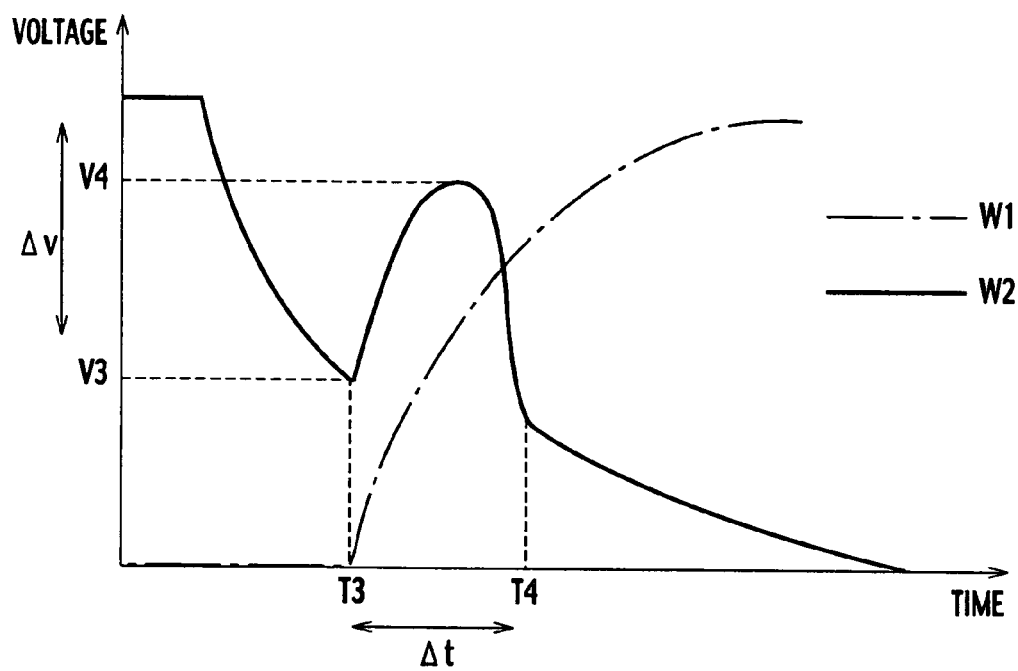
FIG. 4 is a waveform chart schematically showing crosstalk noise generated in a falling signal.

The "noise voltage in a falling signal" is voltage of crosstalk noise generated in the falling signal propagated through a wire and causes a malfunction of the victim receiver cell. For example, as shown in FIG. 4, with the rising of a signal W1 in the wire N1 of FIG. 2 at a time T1, crosstalk noise is generated in the falling signal W2 propagated through the wire N2, and voltage ($\Delta v = V4 - V3$) of the crosstalk noise causes a malfunction of the receiver cell R1. In this case, the "noise voltage in a falling signal ($\Delta v$)" is stored in the second voltage data storage 33 as the error information.

The "noise duration in a falling signal" is the duration of crosstalk noise generated in the falling signal propagated through a wire and causes a malfunction of the victim receiver cell. For example, as shown in FIG. 4, with the rising of the signal W1 in the wire N1 of FIG. 2 during the period of the time T3 to the time T4, the crosstalk noise is generated in the rising signal W2 transmitted through the wire N2, and the duration ($\Delta t = T4 - T3$) of the crosstalk noise causes a malfunction of the receiver cell R1. In this case, the "noise duration in a falling signal ($\Delta t$)" is stored in the second duration data storage 34 as the error information.

The error information varies depending on the type and characteristics of the victim receiver cell. Accordingly, the error information storage unit 3 stores a plurality of error information which varies depending on the type and characteristics of the victim receiver cell.

The main memory unit 4 stores the layout pattern supplied as data by the logic connection information input unit 1 and data processed by the CPU 2. The output unit 5 transmits a part of the layout pattern at which it is judged or determined that a malfunction due to crosstalk noise is created.

Figure 5:
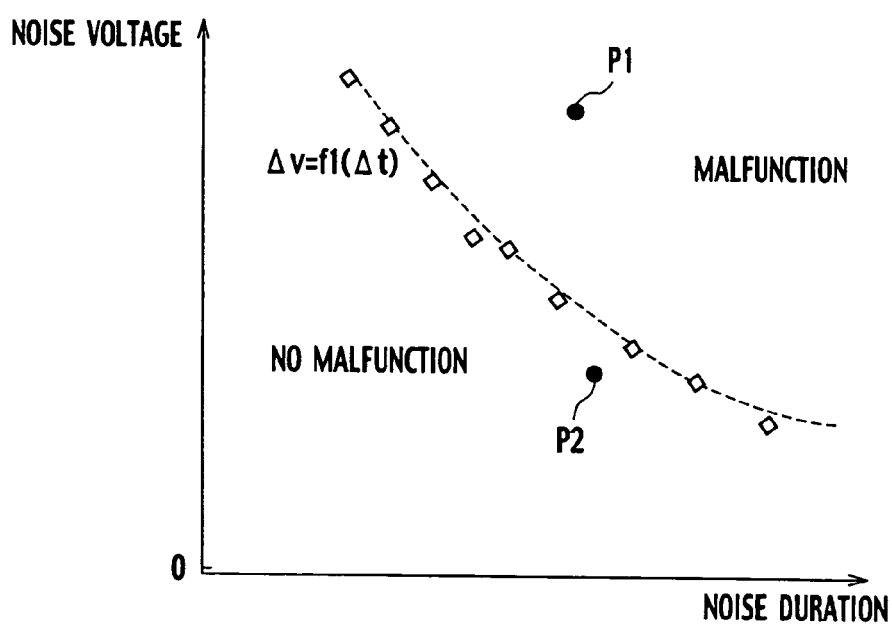
FIG. 5 is a graph schematically showing a combinational error criterion of noise voltage in a falling signal and noise duration in the falling signal.

The error criterion generation section 10 selects the error information from the error information storage unit 3, and generates an error criterion according to the victim receiver cell. A plurality of error information may be selected. Then a combination of error criteria is generated by the error criterion generation section 10. For example, when the noise voltage and duration in a falling signal are selected as the error information, the combined error criterion is generated as a value of a function [$\Delta v = f1(\Delta t)$] as shown in FIG. 5. The error criterion generation unit 10 generates as the error criterion the value of the function [$\Delta v = f1(\Delta t)$] which is obtained by plotting the noise voltage and the duration in the falling signal and subjecting the value to smooth processing. Hereinafter, this error criterion is referred to as "a combinational error criterion of noise voltage and noise duration in a falling signal." As the smooth processing, there are the nearest-neighbor smooth, the linear smooth, the cubic smooth, and the like.

The simulation executing section 15 simulates the waveform of a signal in the victim wire, especially, the waveform of a signal supplied to the victim receiver cell for the layout pattern supplied as data by the logic connection information input unit 1. For example, in the logic circuit shown in FIG. 2, the simulation executing section 15 simulates the waveform of the clock signal supplied to the receiver cell R1, namely, the signal propagated through the wire N2.

The noise analysis section 20 detects crosstalk noise from the result of the simulation by the simulation executing section 15, and then measures the "malfunction factors" of the detected crosstalk noise. For example, the noise analysis section 20 measures the voltage ($\Delta v$) and duration ($\Delta t$) of the crosstalk noise generated in the falling signal propagated through the wire N2 of FIG. 2 as shown in FIG. 4.

The comparison section 25 compares the "malfunction factors" of the crosstalk noise measured by the noise analysis section 20 to the error criterion generated by the error criterion generation section 10. For example, the comparison section 25 compares a point representing the voltage ($\Delta v$) and duration ($\Delta t$) of the crosstalk noise generated in the falling signal propagated through the wire, which are shown in FIG. 4, to the combinational error criterion of noise voltage and noise duration in a falling signal shown in FIG. 5. As a result of the comparison, when the "malfunction factors" meet the error criterion, the comparison section 25 judges or determines that the crosstalk noise causes a malfunction of the victim receiver cell, and transmits an "error signal" to the output unit 5 indicating that a malfunction will be created. On the contrary, when the "malfunction factors" do not meet the error criterion, the comparison section 25 judges or determines that the crosstalk noise does not create a malfunction of the victim receiver cell, and transmits a "normal signal" to the output unit 5 indicating that a malfunction will not be created.

For example, as shown in FIG. 5, it is assumed that the voltage ($\Delta v$) and duration ($\Delta t$) of the crosstalk noise generated in the falling signal propagated through the wire are represented by a point P1. In this case, since the point P1 is in a region above the value of the combinational error criterion of the noise voltage and the noise duration in the falling signal, the comparison section 25 transmits the "error signal" to the output unit 5. On the contrary, it is assumed that the voltage ($\Delta v$) and duration ($\Delta t$) of the crosstalk noise are represented by a point P2 of FIG. 5. In this case, the point 2 is in a region below the value of the combinational error criterion, and the comparison section 25 transmits the "normal signal" to the output unit 5.

Figure 6:
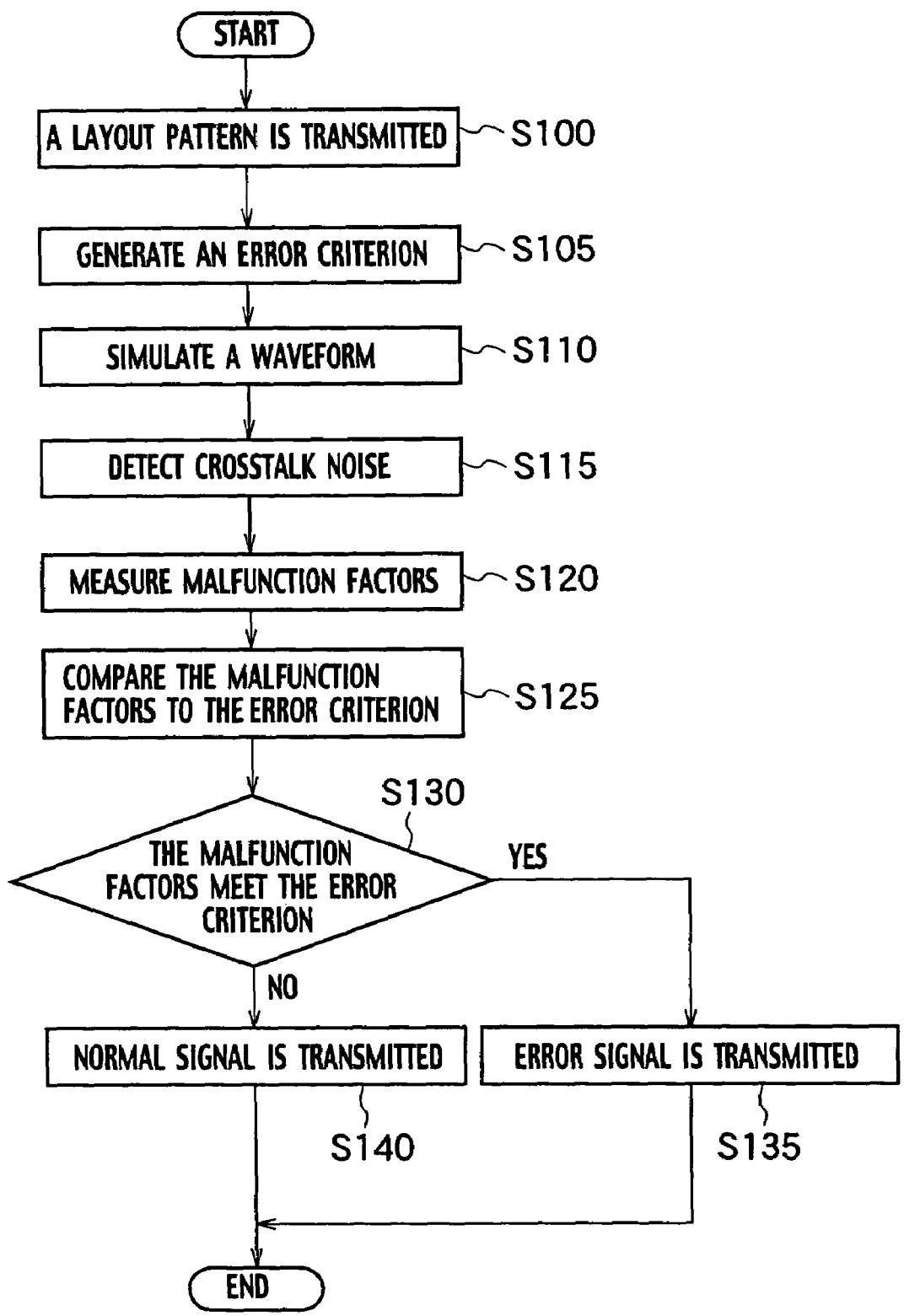
FIG. 6 is flow diagram schematically showing a method for analyzing noise of the first embodiment of the present invention.

A description will be given of a crosstalk noise analysis method according to the first embodiment of the present invention with reference to the flowchart of FIG. 6.

(a) In step S100, the layout pattern of the logic circuit to be designed is supplied as data by the logic connection information input unit 1. In step S105, the error criterion generation section 10 generates an error criterion. For example, the error criterion generation section 10 generates the combinational error criterion of noise voltage and noise duration in a falling signal.

(b) In step S110, the simulation executing section 15 simulates the waveform of a signal in the victim wire for the layout pattern supplied as data by the logic connection information input unit 1.

(c) In step S115, the noise analysis section 20 detects crosstalk noise. In step S120, the noise analysis section 20 measures the "malfunction factors" of the detected crosstalk noise.

(d) In step S125, the comparison section 25 compares the "malfunction factors" of the crosstalk noise measured by the noise analysis section 20 to the error criterion generated by the error criterion generation section 10. As a result of the comparison, when the "malfunction factors" meet the error criterion in step S130, the comparison section 25 judges that the crosstalk noise creates a malfunction of the victim receiver cell and transmits the "error signal" to the output unit 5 indicating that a malfunction will be created in step S135. On the contrary, when the "malfunction factors" do not meet the error criterion in step S130, the comparison section 25 judges that the crosstalk noise does not create a malfunction of the victim receiver cell and transmits the "normal signal" to the output unit 5 indicating that a malfunction will not be created in step S140.

According to the first embodiment of the present invention, the influence of crosstalk noise in the transition state can be accurately ascertained. Moreover, it is possible to optimally design a logic circuit which does not create a malfunction due to crosstalk noise. Accordingly, the circuit area and power dissipation are reduced.

(Second Embodiment)

Figure 7:
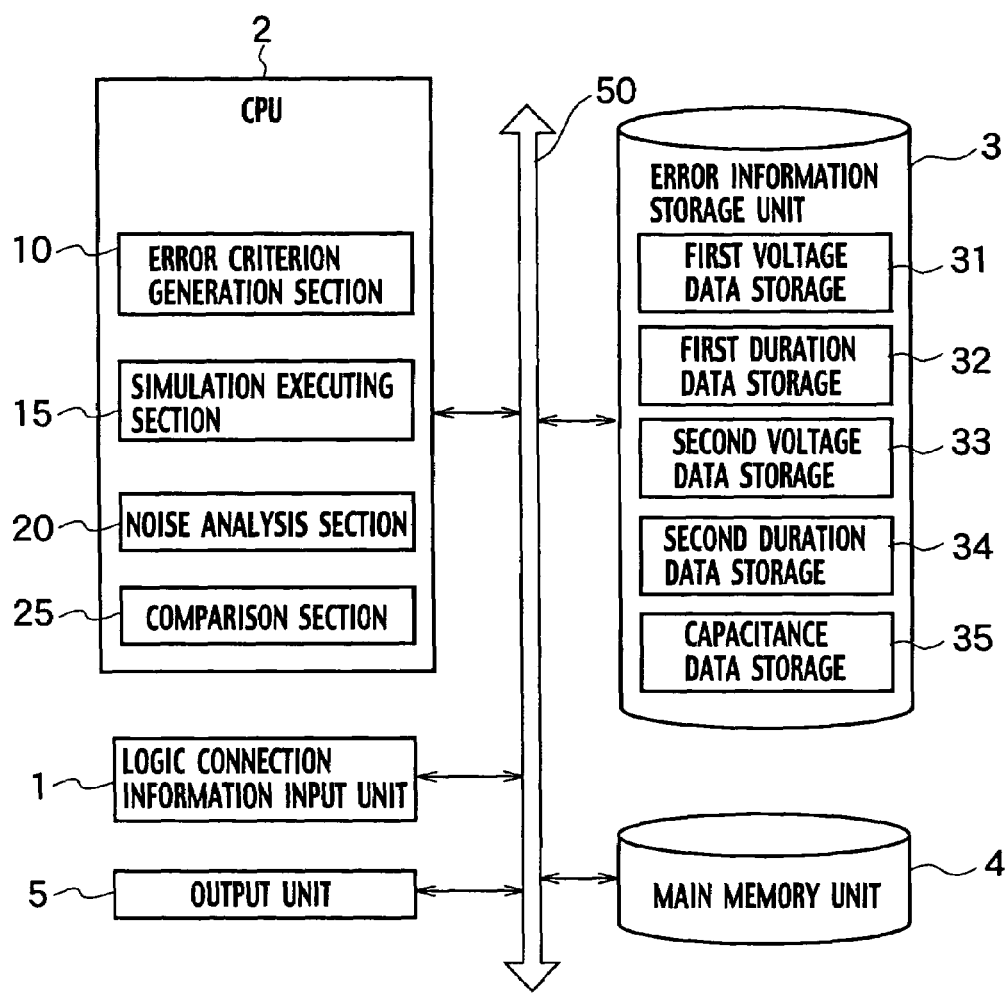
FIG. 7 is a view schematically showing a system for analyzing noise of a second embodiment of the present invention.

As shown in FIG. 7, a crosstalk noise analysis system according to a second embodiment of the present invention differs from that according to the first embodiment of the present invention shown in FIG. 1 in that the error information storage unit 3 includes a data storage section 35 which stores victim receiver cell load capacity as error information.

The "victim receiver cell load capacity" indicates load capacity of the victim receiver cell when the victim receiver cell is malfunctioning because of crosstalk noise. For example, when the "the noise voltage in the falling signal ($\Delta v$)" and "the noise duration in the falling signal ($\Delta t$)" shown in FIG. 4 cause a malfunction of the receiver cell R1 in FIG. 2, the load capacity of the receiver cell R1 is stored in the data storage section 35 as the error information "victim receiver cell load capacity (C)."

Figure 8:
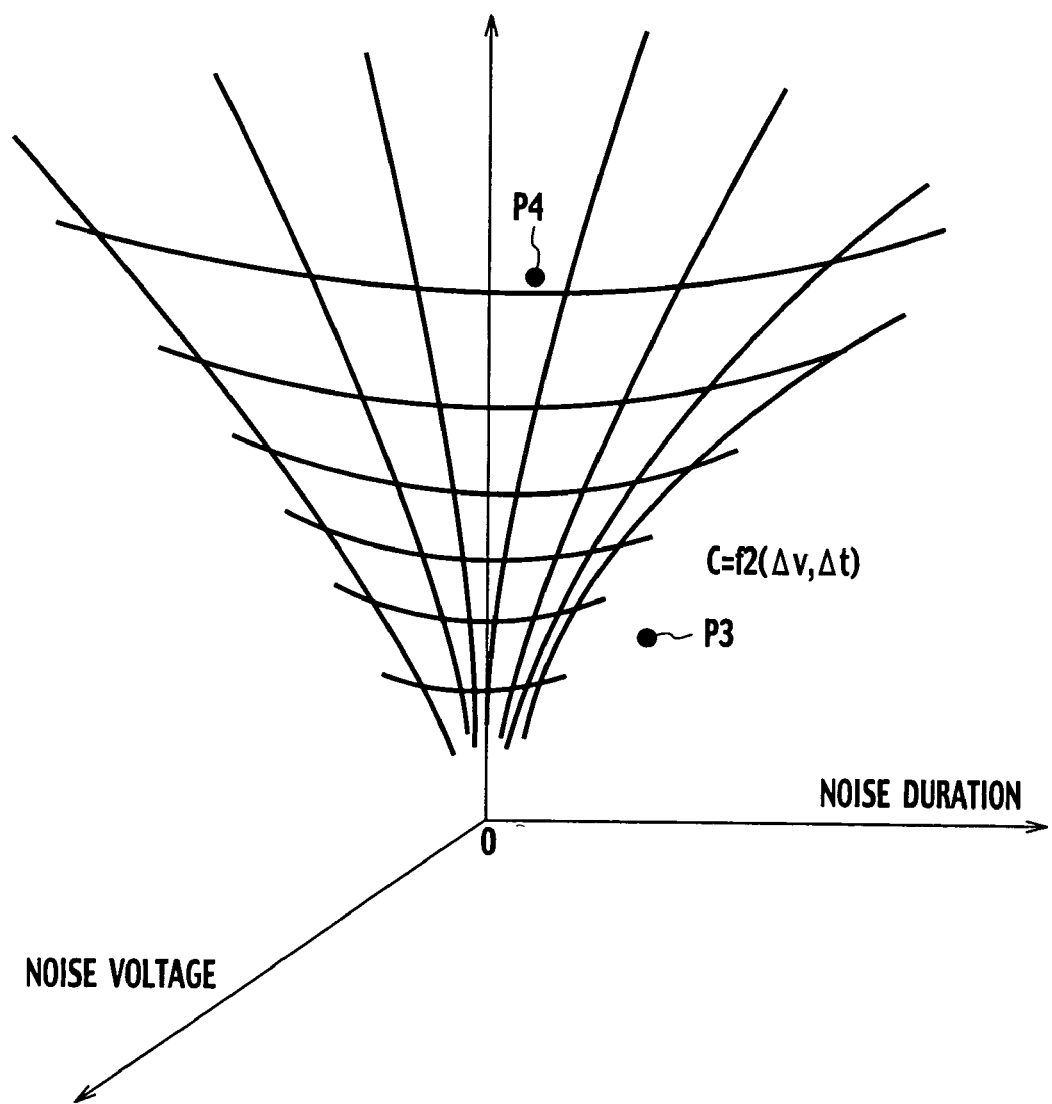
FIG. 8 is a graph schematically showing a combinational error criterion of noise voltage in a falling signal, noise duration in the falling signal, and victim receiver cell load capacity.

In the case of selecting the noise voltage and duration in the falling signal, and the victim receiver cell load capacity, the error criterion generation section 10 generates a value of a function [$C = f2(\Delta v, \Delta t)$] shown in FIG. 8 as the error criterion. The error criterion generation section 10 sets as the error criterion the value of the function [$C = f2(\Delta v, \Delta t)$] obtained by plotting the noise voltage in the falling signal, the noise duration in the falling signal, and the victim receiver cell load capacity and subjects the value to the smooth processing. Hereinafter, this error criterion is referred to as a combinational error criterion of noise voltage and noise duration in a falling signal and victim receiver cell load capacity.

Figure 9:
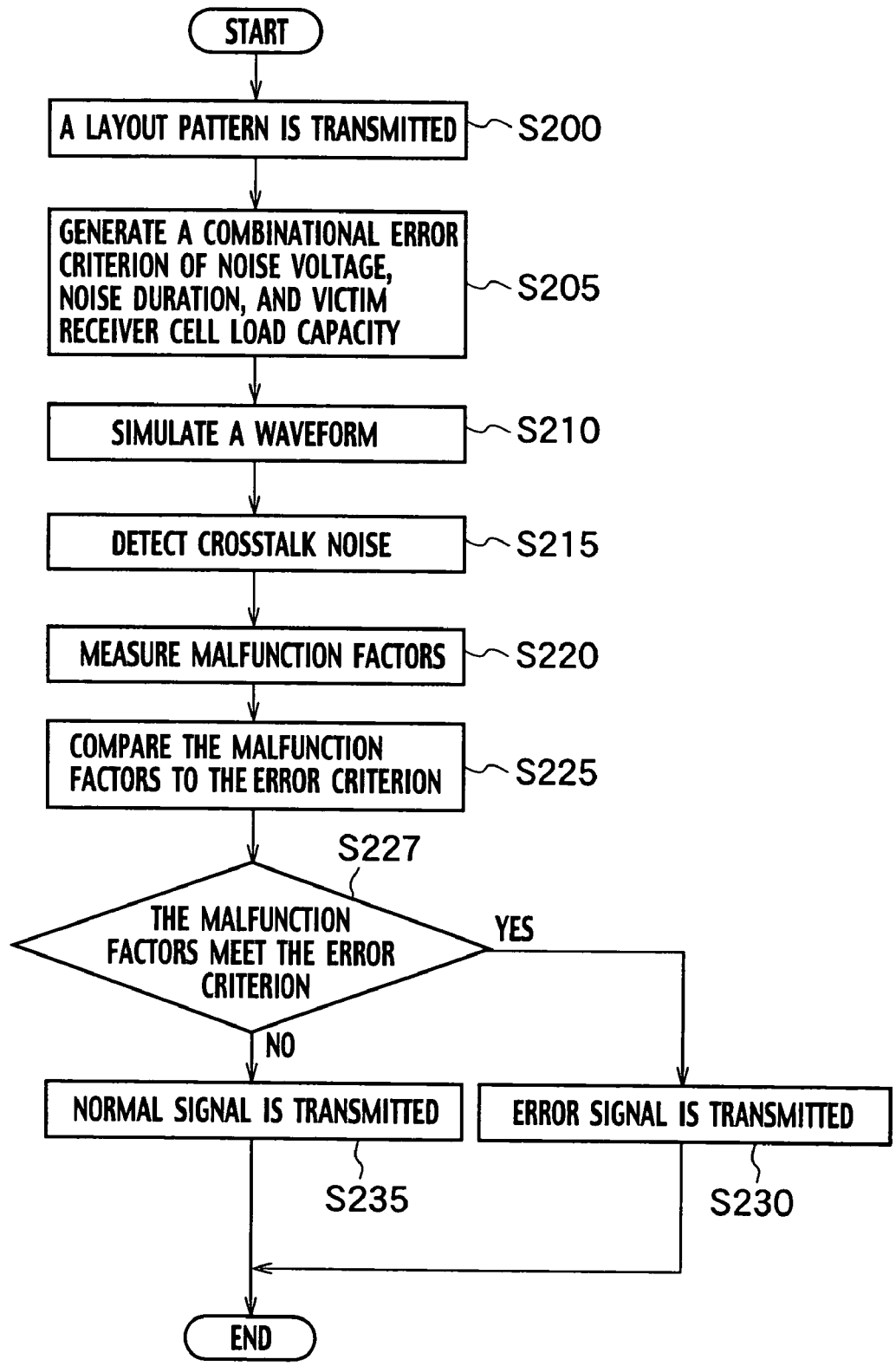
FIG. 9 is flow diagram schematically showing a method for analyzing noise of the second embodiment of the present invention.

A description will be given of a crosstalk noise analysis method according to the second embodiment of the present invention with reference to the flowchart of FIG. 9.

(a) In step S200, the layout pattern of the logic circuit to be designed is supplied as data by the logic connection information input unit 1. In step S205, the error criterion generation section 10 generates the combinational error criterion of the noise voltage and noise duration in the falling signal and victim receiver cell load capacity.

(b) In step S210, the simulation executing section 15 simulates the waveform of a signal in the victim wire for the layout pattern supplied as data by the logic connection information input unit 1.

(c) In step S215, the noise analysis section 20 detects crosstalk noise. In step S220, the noise analysis section 20 measures the voltage and duration of the crosstalk noise propagated through the victim wire and the load capacity of the victim receiver cell, which are the "malfunction factors" of the detected crosstalk noise. For example, the noise analysis section 20 measures the voltage ($\Delta v$) and duration ($\Delta t$) of the crosstalk noise generated in the falling signal propagated through the wire N2 in FIG. 2 and the load capacity of the receiver cell R1 in FIG. 2.

(d) In step S225, the comparison section 25 compares a point representing the voltage and duration of the crosstalk noise and the load capacity of the victim receiver cell to the combinational error criterion of the noise voltage and noise duration in the falling signal and victim receiver cell load capacity generated by the error criterion generation section 10. As a result of the comparison, when the point representing the voltage and duration of the crosstalk noise and the load capacity of the victim receiver cell as the "malfunction factors" is above the value of the combinational error criterion of the noise voltage and noise duration in the falling signal and victim receiver cell load capacity in step S227, the comparison section 25 transmits the "error signal" to the output unit 5 in step S230. On the contrary, when the point representing the voltage and duration of the crosstalk noise and the load capacity of the victim receiver cell is not above the value of the combinational error criterion of the noise voltage and noise duration in the falling signal and victim receiver cell load capacity in step S227, the comparison section 25 transmits the "normal signal" to the output unit 5 in step S235.

For example, it is assumed that the voltage and duration of the crosstalk noise and the load capacity of the victim receiver cell are represented by a point P3 in FIG. 8. In this case, the point P3 is located in a region above the error criterion, and the comparison section 25 transmits the "error signal" to the output unit 5. On the contrary, it is assumed that the voltage and duration of the crosstalk noise and the load capacity of the victim receiver cell are represented by a point P4 in FIG. 8. In this case, the point P4 is located in a region below the error criterion, and the comparison section 25 transmits the "normal signal" to the output unit 5.

According to the second embodiment of the present invention, the influence of crosstalk noise in the transition state can be accurately ascertained. Moreover, it is possible to optimally design a logic circuit which does not create a malfunction due to crosstalk noise. Accordingly, the a large circuit design is not necessary, and the circuit area and power dissipation are reduced.

(Third Embodiment)

Figure 10:
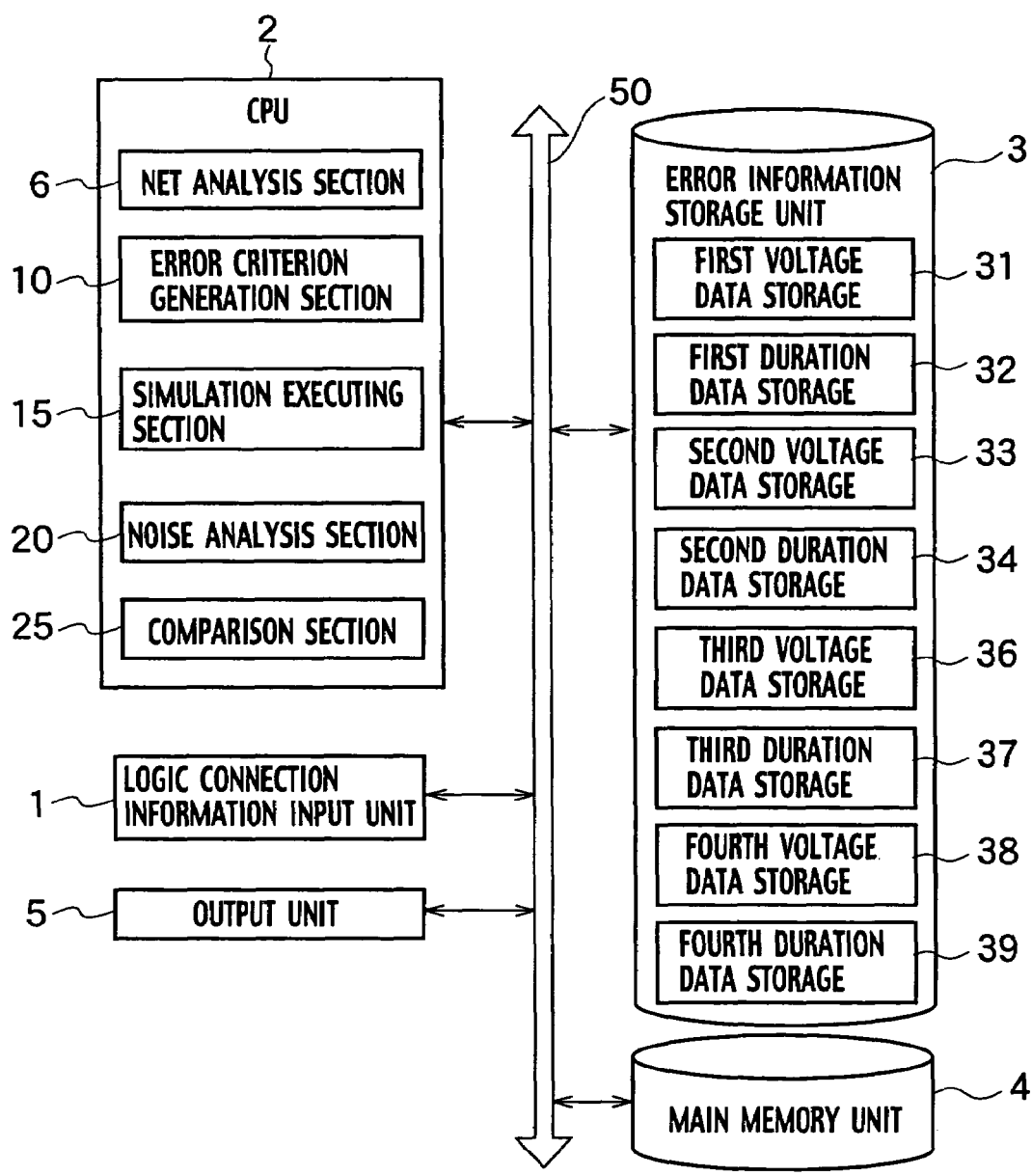
FIG. 10 is a view schematically showing a system for analyzing noise of a third embodiment of the present invention.

As shown in FIG. 10, the crosstalk noise analysis system according to a third embodiment of the present invention differs from that according to the first embodiment of the present invention shown in FIG. 1 in that rising noise voltage in a constant signal is stored in a third voltage data storage 36, rising noise duration in a constant signal is stored in a third duration data storage 37, falling noise voltage in a constant signal is stored in a fourth voltage data storage 38, and falling noise duration in a constant signal is stored in a fourth duration data storage 39 as the error information, respectively. Moreover, the crosstalk noise analysis system according to the third embodiment of the present invention differs from that according to the first embodiment of the present invention shown in FIG. 1 in that it includes a net analysis section 6.

Figure 11:
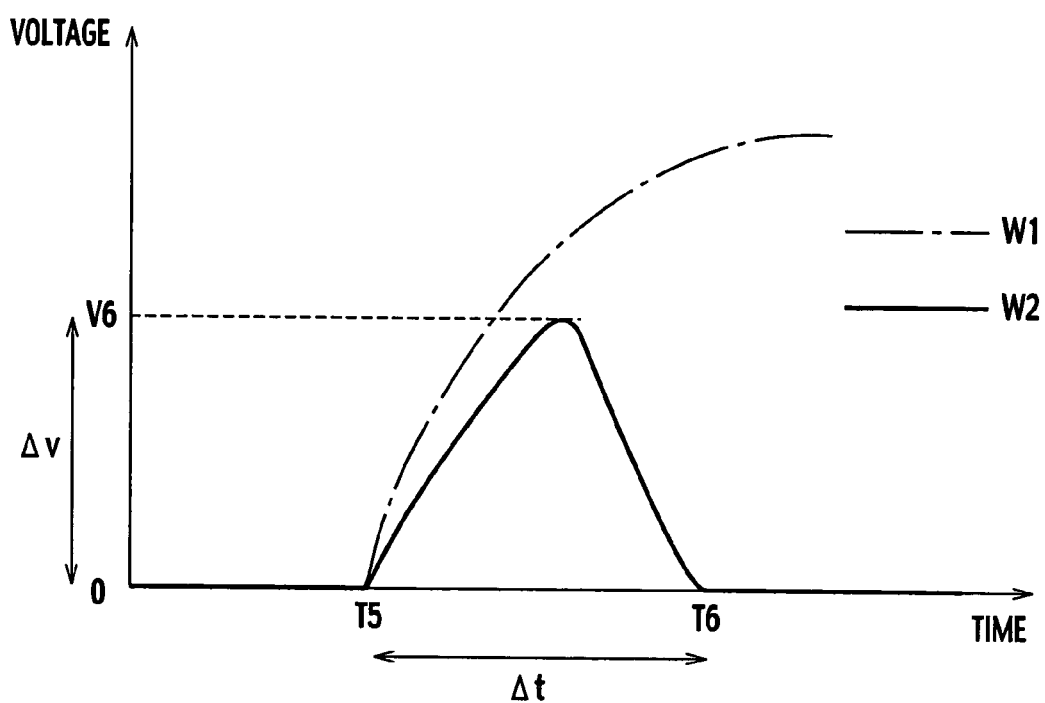
FIG. 11 is waveform chart schematically showing rinsing crosstalk noise in a constant signal.

The "rising noise voltage in a constant signal" is voltage of crosstalk noise generated in a constant signal propagated through a wire and causes the victim receiver cell to misidentify the crosstalk noise as the rising signal. For example, as shown in FIG. 11, with the rising of a signal W1 in the wire N1 of FIG. 2 at a time T5, crosstalk noise with a voltage ($\Delta v$) is generated in a constant low signal W2 propagated through the wire N2 of FIG. 2 and causes a malfunction of the receiver cell R1 of FIG. 2 as a rising signal. In this case, the rising noise voltage in the constant signal ($\Delta v$) is stored as error information in the third voltage data storage 36.

The "rising noise duration in a constant signal" is duration of crosstalk noise generated in the constant signal propagated through a wire and causes the victim receiver cell to misidentify the crosstalk noise as a rising signal. For example, as shown in FIG. 11, with the rising of the signal W1 in the wire N1 at the time T5, crosstalk noise with a duration ($\Delta t = T6 - T5$) is generated in the wire N2 when the signal W2 is in the static state and causes a malfunction of the receiver cell R1 as a rising signal. In this case, the rising noise duration in the constant signal ($\Delta t$) is stored as error information in the third duration data storage 37.

Figure 12:
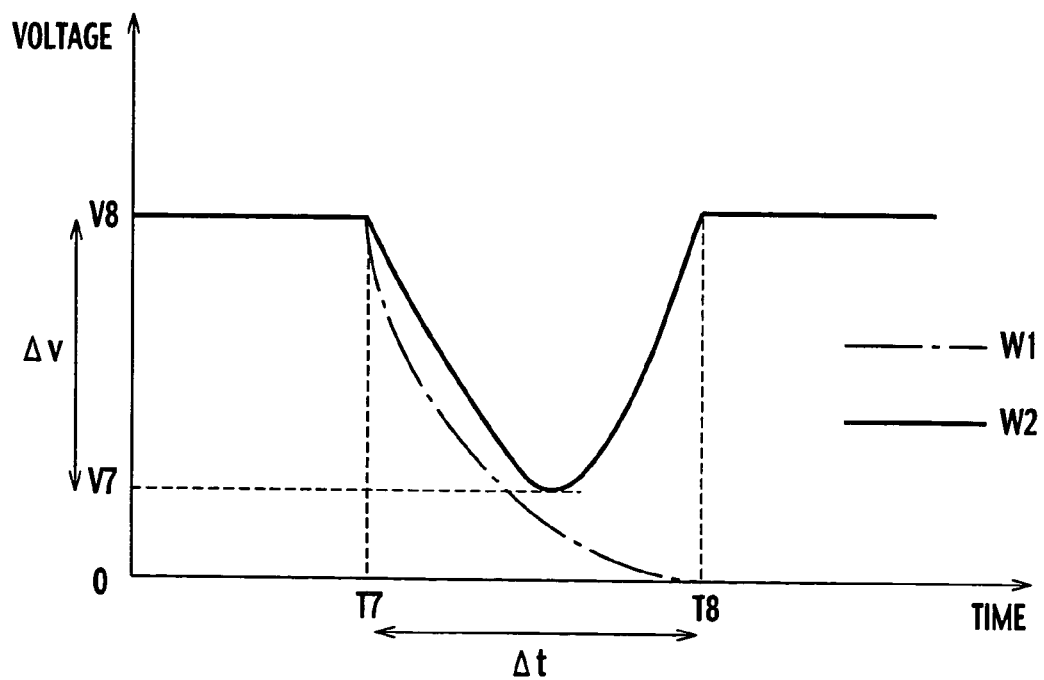
FIG. 12 is waveform chart schematically showing falling crosstalk noise in a constant signal.

The "falling noise voltage in a constant signal" is voltage of crosstalk noise generated in a constant signal propagated through a wire and causes the victim receiver cell to misidentify the crosstalk noise as a falling signal. For example, as shown in FIG. 12, with the falling of a signal W1 in the wire N1 at a time T7, crosstalk noise with a voltage ($\Delta v = V8 - V7$) is generated in a constant high signal W2 propagated through the wire N2 and causes a malfunction of the receiver cell R1 as a falling signal. In this case, the falling noise voltage in the constant signal ($\Delta v$) is stored as error information in the fourth voltage data storage 38.

The "falling noise duration in a constant signal" is duration of crosstalk noise generated in the constant signal propagated through a wire and causes the victim receiver cell to misidentify the crosstalk noise as the falling signal. For example, as shown in FIG. 12, with the falling of the signal W1 in the wire N1 at the time T7, crosstalk noise with a duration ($\Delta t = T8 - T7$) is generated in the wire N2 when the signal W2 is in the static state and causes a malfunction of the receiver cell R1 as a falling signal. In this case, the falling noise duration in a constant signal ($\Delta t$) is stored as error information in the fourth duration data storage 39.

The net analysis section 6 distinguishes, in the layout pattern supplied as data by the logic connection information input unit 1, a net through which the clock signal is propagated from a net through which the general signal other than the clock signal is propagated. For example, in FIG. 2, the wire N2 through which the clock signal is propagated is distinguished from the wire N1 through which the general signal is propagated. For the net with the general signal propagated therethrough, the net analysis section 6 orders the error criterion generation section 10 to eliminate the error criterion relating to the malfunction factors caused in the rising and falling signals propagated through the victim wire.

Figure 13:
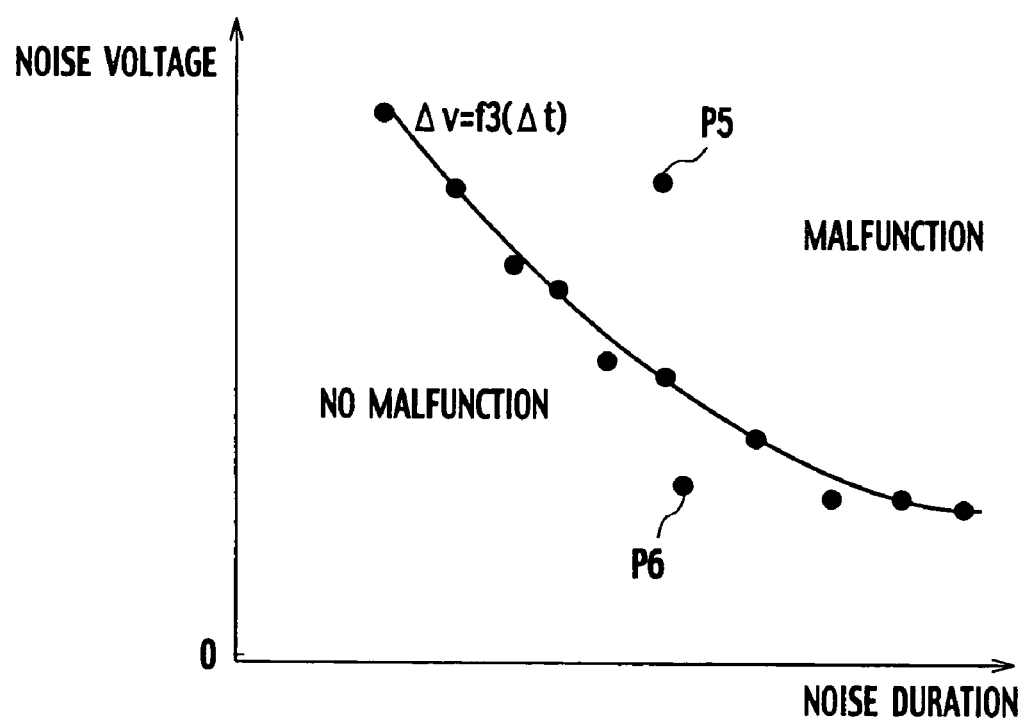
FIG. 13 is a graph schematically showing a combinational error criterion of rising noise voltage and rising noise duration in a constant signal.

In the case of selecting the rising noise voltage and duration in the constant signal from the error information storage unit 3, the error criterion generation section 10 generates a value of a function [$\Delta v = f3(\Delta t)$] shown in FIG. 13 as the error criterion. The error criterion generation section 10 sets, as the error criterion, the value of the function [ $\Delta v=f3(\Delta t)$] obtained by plotting the rising noise voltage in the signal and rising noise duration in the signal and subjecting the value to the smooth processing. Hereinafter, this error criterion is referred to as a combinational error criterion of rising noise voltage and duration in a constant signal.

For the net having the general signal propagated therethrough, the error criterion generation section 10 does not generate the error criterion relating to the malfunction factors generated in the rising and falling signals propagated through the victim wire. For example, for the net having the general signal propagated therethrough, the combinational error criterion of noise voltage and noise duration in a falling signal is not generated, and only the combinational error criterion of rising noise voltage and rising noise duration in a constant signal is generated. In this case, the influence of the crosstalk noise on the rising or falling signal is eliminated by adjusting a delay of the general signal.

Figure 14:
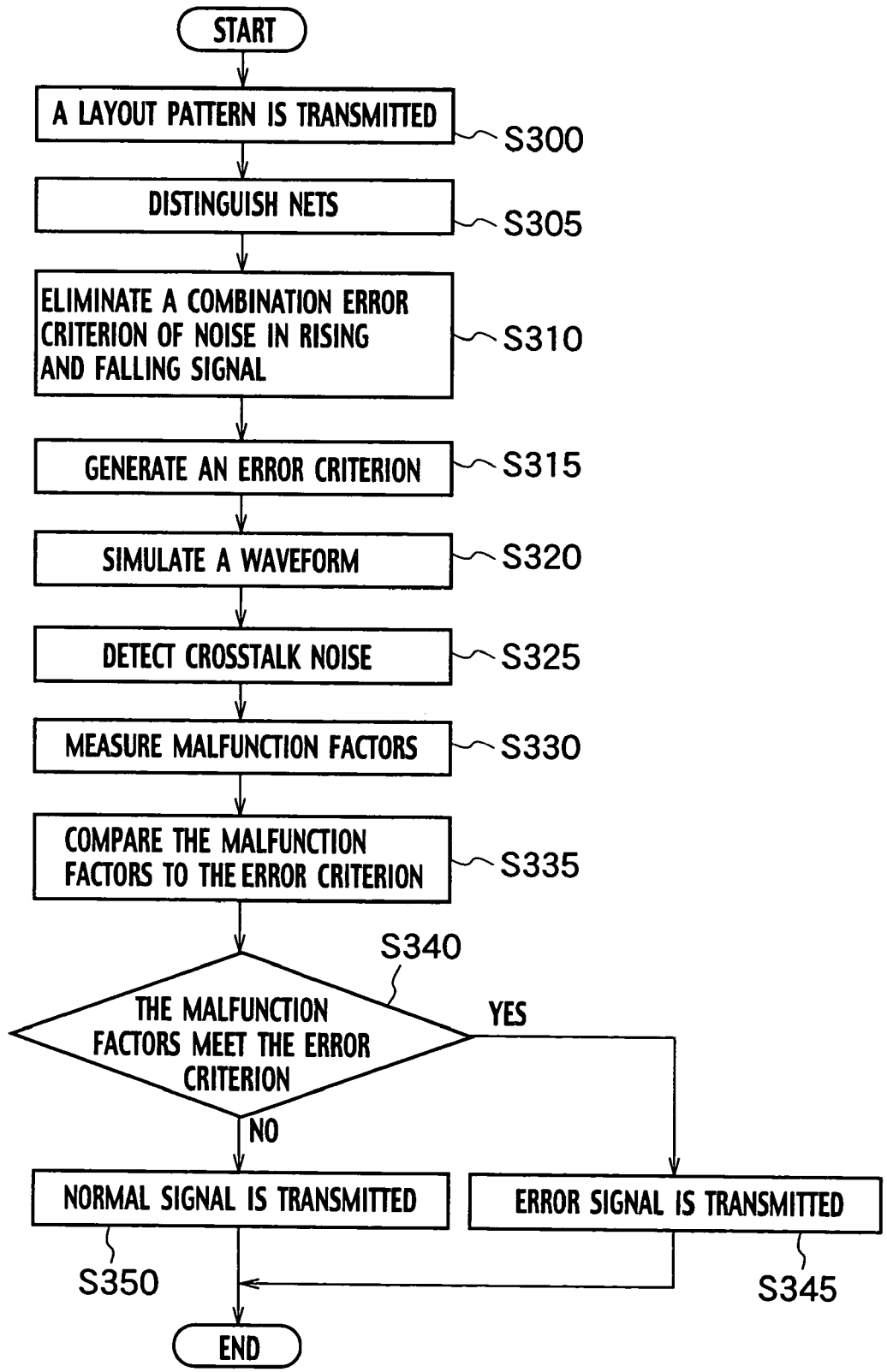
FIG. 14 is flow diagram schematically showing a method for analyzing noise of the third embodiment of the present invention.

A description will be given of a crosstalk noise analysis method according to the third embodiment of the present invention with reference to a flowchart of FIG. 14.

(a) In step S300, the layout pattern of the logic circuit to be designed is supplied as data by the logic connection information input unit 1. In step S305, the net analysis section 6 distinguishes the net with the clock signal propagated therethrough from the net with the general signal propagated therethrough in the layout pattern. In step S310, as for the net with the general signal propagated therethrough, the net analysis section 6 orders the error criterion generation section 10 to eliminate the error criterion relating to the malfunction factors generated in the rising and falling signals. In step S315, the error criterion generation section 10 generates an error criterion. At this time, the eliminated error criterion is not generated.

(b) In step S320, the simulation executing section 15 simulates the waveforms of the signals in the transition and static states for the layout pattern.

(c) In step S325, the noise analysis section 20 detects crosstalk noise. In step S330, the noise analysis section 20 measures the "malfunction factors" of the detected crosstalk noise. For example, the noise analysis section 20 measures the voltage ( $\Delta v$) and duration ( $\Delta t$) of the crosstalk noise generated in the constant signal and the voltage ( $\Delta v$) and duration ( $\Delta t$) of the crosstalk noise generated in the falling signal.

(d) In step S335, the comparison section 25 compares the "malfunction factors" of the crosstalk noise measured by the noise analysis section 20 to the error criterion generated by the error criterion generation section 10.

For example, the comparison section 25 compares a point representing the voltage ( $\Delta v$) and duration ( $\Delta t$) of the crosstalk noise to the combinational error criterion of the rising noise voltage and the noise duration in the constant signal generated by the error criterion generation section 10. As for the clock signal, the comparison section 25 further compares a point representing the voltage and duration of the crosstalk noise generated in the falling signal to the combinational error criterion of the noise voltage and the noise duration in the falling signal.

(e) As a result of the comparison, when the "malfunction factors" meet the error criterion in step S340, the comparison section 25 judges that the crosstalk noise creates a malfunction of the victim receiver cell and transmits the "error signal" to the output unit 5 indicating that a malfunction will be created in step S345. On the contrary, when the "malfunction factors" do not meet the error criterion in step S340, the comparison section 25 judges that the crosstalk noise does not create a malfunction of the victim receiver cell and transmits the "normal signal" to the output unit 5 indicating that a malfunction is not to be caused in step S350.

For example, the voltage ( $\Delta v$) and duration ( $\Delta t$) of the crosstalk noise generated in the constant signal are represented by a point P5 in FIG. 13. In this case, since the point P5 is located in a region above the error criterion, the comparison section 25 transmits the "error signal" to the output unit 5. On the contrary, as for the net with the general signal propagated therethrough, the voltage ( $\Delta v$) and duration ( $\Delta t$) of the crosstalk noise generated in the constant signal are represented by a point P6 in FIG. 13. In this case, since the point P6 is located in a region below the combinational error criterion of the noise voltage and the noise duration in the constant signal, the comparison section 25 transmits the "normal signal" to the output unit 5.

According to the third embodiment of the present invention, the selection of the error criterion to be used for each net allows reduction of pseudo errors in the crosstalk noise analysis, thus speeding up the optimal design process of the logic circuit.

(Fourth Embodiment)

Figure 15:
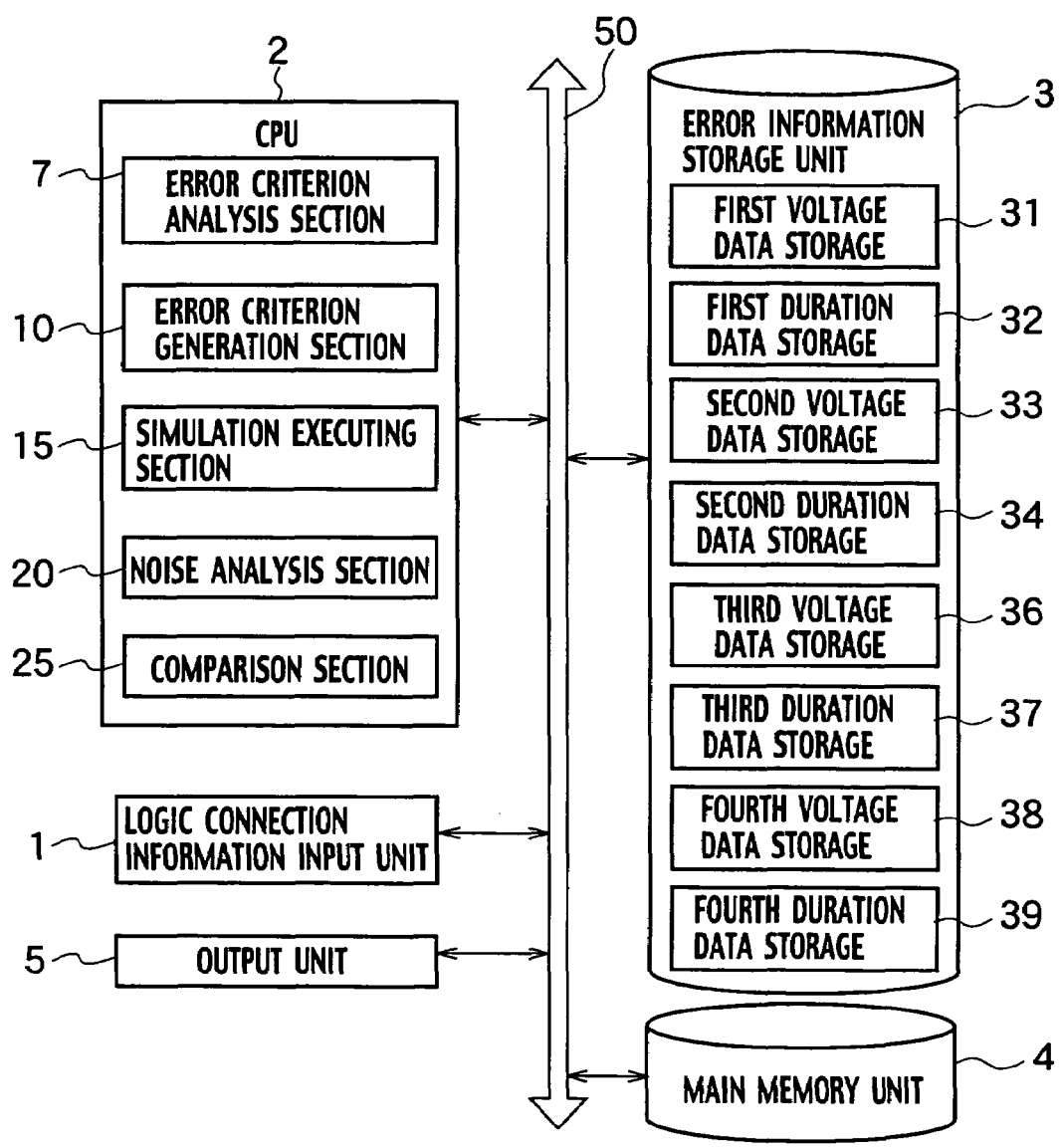
FIG. 15 is a view schematically showing a system for analyzing noise of a fourth embodiment of the present invention.

As shown in FIG. 15, a crosstalk noise analysis system according to a fourth embodiment of the present invention differs from that according to the first embodiment of the present invention shown in FIG. 1 in that the rising noise voltage in the constant signal, the rising noise duration in the constant signal, the falling noise voltage in the constant signal, and the falling noise duration in the constant signal are stored as the error information in the data storage 36 to 39, respectively. Moreover, the crosstalk noise analysis system according to the fourth embodiment of the present invention differs from that according to the first embodiment of the present invention shown in FIG. 1 in that it includes an error criterion analysis section 7.

The error criterion analysis section 7 analyzes a plurality of error criteria generated by the error criterion generation section 10. When any one of the plurality of error criteria is included by another error criterion, the error criterion analysis section 7 orders the comparison section 25 to eliminate the included error criterion. The comparison section 25 eliminates that error criterion. For example, in FIG. 16, when the noise voltage and the noise duration in the falling signal is above the combinational error criterion, a point representing the voltage and duration of crosstalk noise is always above the combinational error criterion of the rising noise voltage and noise duration in the constant signal. In other words, the combinational error criterion of the noise voltage and noise duration in the falling signal is included by the combinational error criterion of the rising noise voltage and noise duration in the constant signal. Accordingly, in this case, the combinational error criterion of the noise voltage and noise duration in the falling signal is eliminated from the error criteria.

Figure 17:
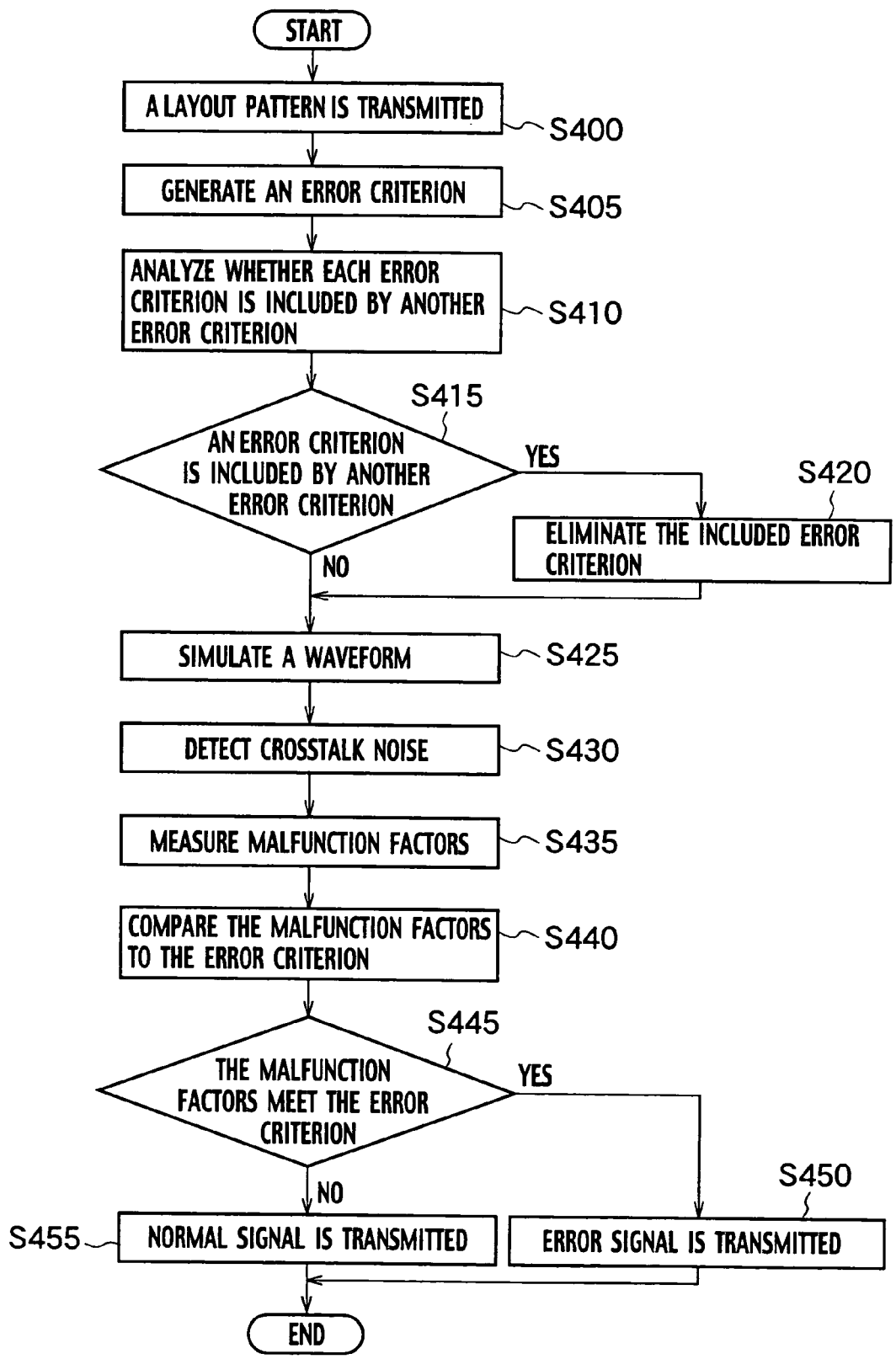
FIG. 17 is a flow chart schematically showing a method for analyzing noise of the forth embodiment of the present invention.

A description will be given of a crosstalk noise analysis method according to the fourth embodiment of the present invention with reference to a flowchart of FIG. 17.

(a) In step S400, the layout pattern of the logic circuit to be designed is supplied as data by the logic connection information input unit 1. In step S405, the error criterion generation section 10 generates the error criteria. For example, the error criterion generation section 10 generates the combinational error criterion of the noise voltage and noise duration in the falling signal and the combinational error criterion of the rising noise voltage and noise duration in the constant signal from the error information storage unit 3. In step S410, the error criterion analysis section 7 analyzes whether each error criterion is included in another error criterion. For example, the error criterion analysis section 7 analyzes whether one of the error criteria "the noise voltage and noise duration in the falling signal" and "the rising noise voltage and noise duration in the constant signal" is included in the other. When it is analyzed that an error criterion is included in another error criterion in step S415, the error criterion analysis section 7 orders the comparison section 25 to eliminate the included error criterion in step S420, and the procedure proceeds to step S425.

(b) In step S425, the simulation executing section 15 simulates the waveform of the signal propagated through the victim wire for the layout pattern.

(c) In step S430, the noise analysis section 20 detects crosstalk noise. In step S435, the noise analysis section 20 measures the "malfunction factors" of the detected crosstalk noise. For example, the noise analysis section 20 measures the voltage ($\Delta v$) and duration ($\Delta t$) of the crosstalk noise generated in the constant signal and the voltage ($\Delta v$) and duration ($\Delta t$) of the crosstalk noise generated in the falling signal.

Figure 16:
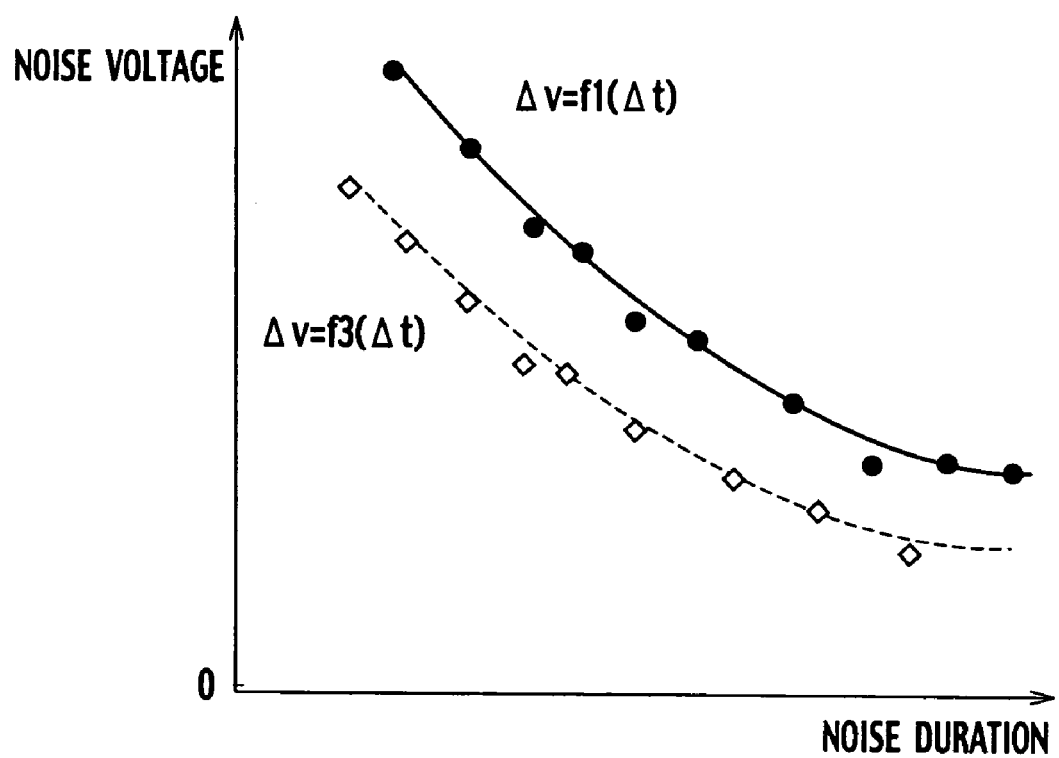
FIG. 16 is a graph schematically showing that a combinational error criterion of rising noise voltage and rising noise duration in a constant signal is above a combinational error criterion of noise voltage and noise duration in a falling signal.

(d) In step S440, the comparison section 25 compares the "malfunction factors" of the crosstalk noise measured by the noise analysis section 20 to the error criterion generated by the error criterion generation section 10. In this case, the comparison section 25 does not use the eliminated error criterion. For example, in the case where the combinational error criterion of the noise voltage and noise duration in the falling signal is included by the combinational error criterion of the rising noise voltage and noise duration in the constant signal as shown in FIG. 16, the comparison section 25 does not compare the voltage ($\Delta v$) and duration ($\Delta t$) of the crosstalk noise generated in the falling signal to the combinational error criterion of the noise voltage and noise duration in the falling signal generated by the error criterion generation section 10.

(e) As a result of the comparison, when the "malfunction factors" meet the error criterion in step S445, the comparison section 25 judges that the crosstalk noise creates a malfunction of the victim receiver cell and transmits the "error signal" to the output unit 5 indicating that a malfunction will be created in step S450. On the contrary, when the "malfunction factors" do not meet the error criterion in step S445, the comparison section 25 judges that the crosstalk noise does not cause a malfunction of the victim receiver cell and transmits the "normal signal" to the output unit 5 indicating that a malfunction will not be created in a step S445.

According to the fourth embodiment of the present invention, the selection of the error criterion for each net allows reduction of the pseudo-errors in the crosstalk noise analysis, thus speeding up the optimal design process of the logic circuit.

(Fifth Embodiment)

Figure 18:
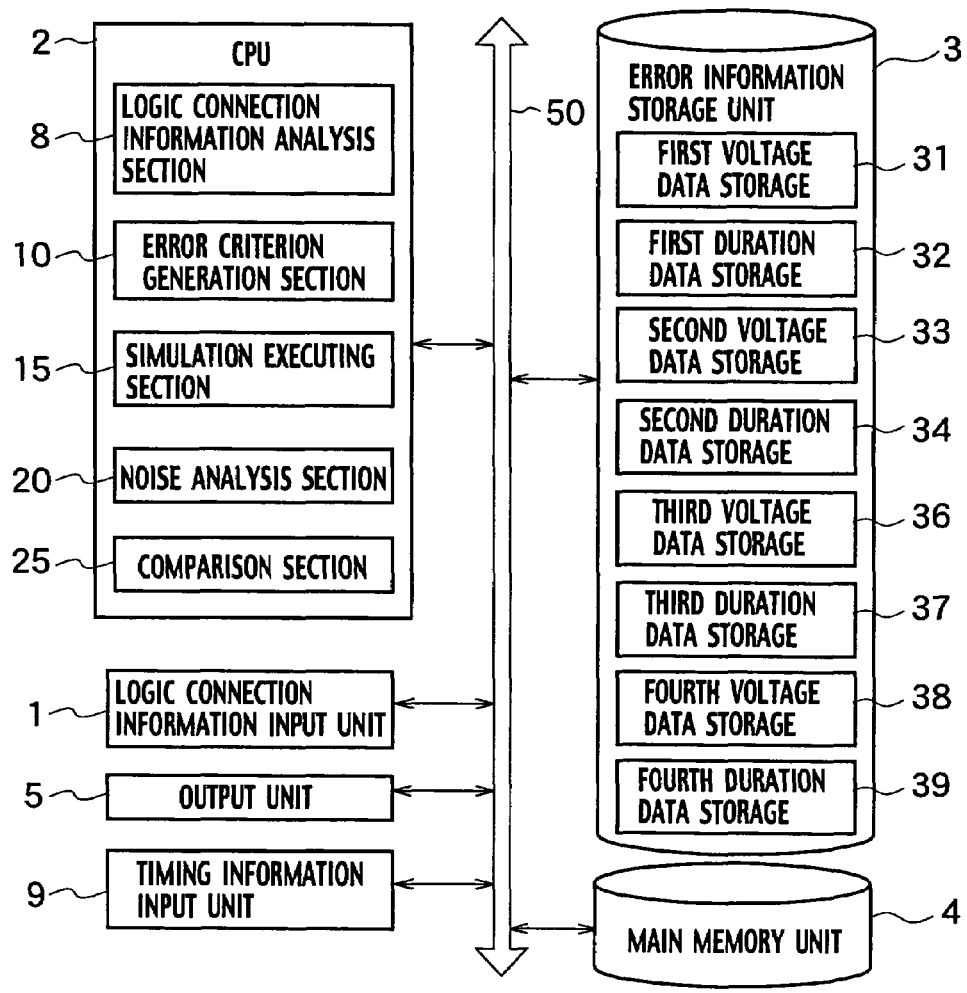
FIG. 18 is a view schematically showing a system for analyzing noise of a fifth embodiment of the present invention.

As shown in FIG. 18, a crosstalk noise analysis system according to the fifth embodiment of the present invention differs from that according to the first embodiment of the present invention shown in FIG. 1 in that the rising noise voltage in the constant signal, the rising noise duration in the constant signal, the falling noise voltage in the constant signal, and the falling noise duration in the constant signal are stored as the error information in the data storage 36 to 39, respectively. Moreover, as shown in FIG. 18, the crosstalk noise analysis system according to the fifth embodiment of the present invention differs from that according to the first embodiment of the present invention shown in FIG. 1 in that it includes a timing information input unit 9 and a logic connection information analysis section 8.

The timing information input unit 9 transmits timing information of the clock and general signals which are supplied to the logic circuit to be designed. The simulation executing section 15 simulates the waveform of the signal propagated through the victim wire using the timing information supplied by the timing information input unit 9. This simulation allows the waveform of the signal to be accurately ascertained.

Figure 19:
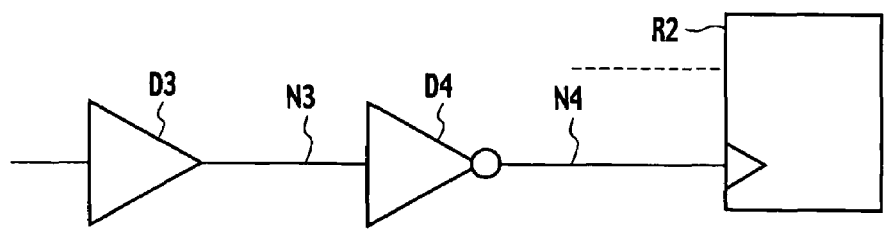
FIG. 19 is a diagram schematically showing a circuit which logic is traced backward from a victim cell.

The logic connection information analysis section 8 analyzes the logic circuit supplied by the logic connection information input unit 1 and selects a signal which causes the victim receiver cell to operate from one of a rising signal and a falling signal propagated through a victim wire. For example, as shown in FIG. 19, a logic circuit comprises a receiver cell R2, a driver D4 transmitting a clock signal through a wire N4, and a driver D3 transmitting the clock signal through a wire N3. The receiver cell R2 operates on the rising clock signal. Specifically, the rising signal propagated through the wire N4 causes operation of the receiver cell R2. Accordingly, the rising signal is selected by the logic connection information analysis section 8 for the wire N4. Meanwhile, since the driver D4 is an inverter, the falling signal propagated through the wire N3 causes operation of the receiver cell R2. Accordingly, the falling signal is selected by the logic connection information analysis section 8 for the wire N3. In such a manner, the logic is traced backward from the victim receiver cell. Alternatively, the logic may be traced from the root of a clock tree. The logic connection information analysis section 8 orders the error criterion generation section 10 to eliminate the error criterion relating to the malfunction factors created the signal that is different from the selected signal. In other words, in the logic circuit shown in FIG. 19, the error criterion relating to the malfunction factors created the falling signal is eliminated for the wire N4, and the error criterion concerning the malfunction factors created the rising signal is eliminated for the wire N3.

The error criterion generation section 10 does not generate the error criterion to be eliminated. For example, for the wire N4, the combinational error criterion of the noise voltage and noise duration in the falling signal and the combinational error criterion of the rising noise voltage and noise duration in the constant signal related to the noise which does not create the malfunction of the victim receiver cell R2 are not generated.

Figure 20:
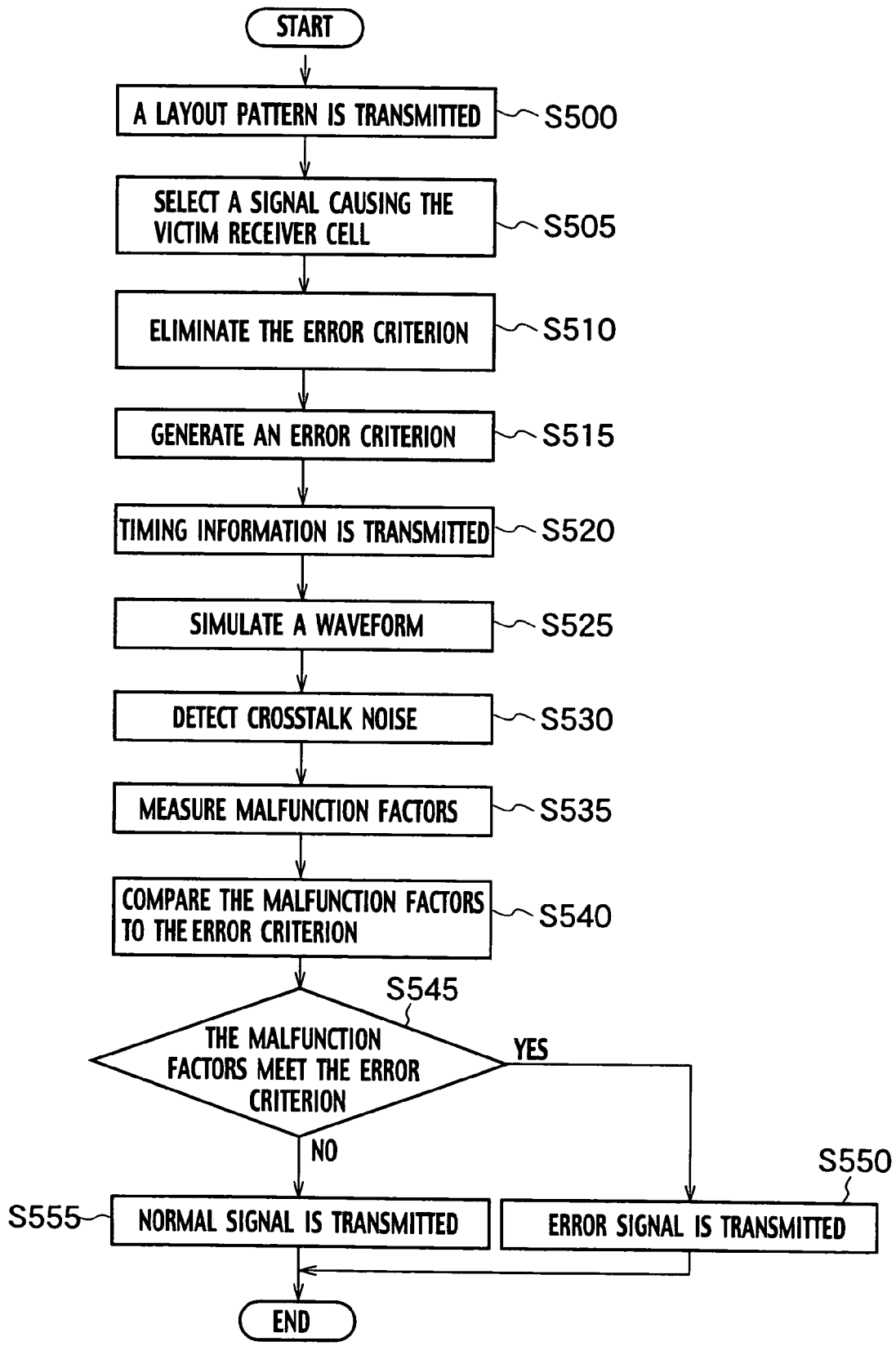
FIG. 20 is a flow chart schematically showing a method for analyzing noise of the fifth embodiment of the present invention.

A computer implemented method for a crosstalk noise analysis according to the fifth embodiment of the present invention will be described with reference to a flowchart of FIG. 20.

(a) In step S500, the layout pattern of the logic circuit to be designed is supplied as data by the logic connection information input unit 1. In step S505, the logic connection information analysis section 8 analyzes the supplied logic circuit and selects a signal that causes the victim receiver cell to operate from among the falling and rising signals propagated through the victim wire. In step S510, the logic connection information analysis section 8 orders the error criterion generation section 10 to eliminate the error criterion related to the malfunction factors relating to the signal that is different from the selected signal. In step S515, the error criterion generation section 10 generates the error criteria. At this time, the error criterion generation section 10 does not generate the error criterion which is to be eliminated.

(b) In step S520, the timing information input unit 9 transmits the timing information of the previously known clock and general signals. In step S525, the simulation executing section 15 simulates the waveforms of the signals in the transition and static states using the timing information supplied by the timing information input unit 9.

(c) In step S530, the noise analysis section 20 detects crosstalk noise. In step S535, the noise analysis section 20 measures the "malfunction factors" of the detected crosstalk noise.

(d) In step S540, the comparison section 25 compares the "malfunction factors" of the crosstalk noise measured by the noise analysis section 20 to the error criterion generated by the error criterion generation section 10.

(e) As a result of the comparison, when the "malfunction factors" meet the error criterion in step S545, the comparison section 25 judges that the crosstalk noise creates a malfunction of the victim receiver cell and transmits the "error signal" to the output unit 5 indicating that a malfunction will be created in step S550. On the contrary, when the "malfunction factors" do not meet the error criterion in step S545, the comparison section 25 judges that the crosstalk noise does not cause a malfunction of the victim receiver cell and transmits the "normal signal" to the output unit 5 indicating that a malfunction will not be created in step S555.

According to the fifth embodiment of the present invention, the selection of the error criterion for each net allows reduction of the pseudo-errors in the crosstalk noise analysis, thus speeding up the optimal design process of the logic circuit.

Various modifications will become possible for those skilled in the art after receiving the teachings of the present disclosure without departing from the scope thereof.

What is claimed is:

1. A system for analyzing noise comprising:
an error information storage unit storing threshold values of malfunction factors that create a malfunction of a victim receiver cell due to a noise;
an error criterion generation section configured to select the threshold values from the error information storage unit, and to generate an error criterion according to the victim receiver cell by plotting the threshold values and subjecting the threshold values to smooth processing;
a noise analysis section configured to measure the malfunction factors;
a comparison section configured to compare the measured malfunction factors to the error criterion, and to judge whether the noise will create a malfunction of the victim receiver cell when the malfunction factors meet the error criterion; and
a net analysis section configured to distinguish a net through which a clock signal is propagated from another net through which a general signal other than the clock signal is propagated and to order the error criterion generation section to eliminate the error criterion relating to the malfunction factors generated in rising and falling signals propagated through the net through which the general signal is propagated.

2. The system of claim 1, further comprising an error criterion analysis section configured to analyze a plurality of error criteria, and to order to eliminate an error criterion from among a plurality of error criteria, which is included in another error criterion from among the plurality of error criteria.

3. The system of claim 2, further comprising:
a logic connection information input unit configured to transmit data to be designed for a layout pattern of a logic circuit; and
a simulation executing section configured to simulate waveforms of the noise and the clock signal in the logic circuit.

4. The system of claim 1, further comprising a logic connection information analysis section configured to select a signal which causes the victim receiver cell to operate from among the falling and rising signals and to order the error criterion generation section to eliminate the error criterion relating to the malfunction factors created in another signal that is different from the signal selected from among the falling and rising signals.

5. The system of claim 4, further comprising:
a logic connection information input unit configured to transmit data to be designed for a layout pattern of a logic circuit; and
a simulation executing section configured to simulate waveforms of the noise and the clock signal in the logic circuit.

6. The system of claim 1, further comprising:
a logic connection information input unit configured to transmit data to be designed for a layout pattern of a logic circuit; and
a simulation executing section configured to simulate waveforms of the noise and the clock signal in the logic circuit.

7. A computer implemented method for analyzing noise comprising:
generating an error criterion according to a victim receiver cell, by plotting threshold values of malfunction factors that create a malfunction of the victim receiver cell due to a noise and subjecting the threshold values to smooth processing;
measuring the malfunction factors;
comparing the measured malfunction factors to the error criterion;
judging whether the noise creates a malfunction of the victim receiver cell when the malfunction factors meet the error criterion;
distinguishing a net through which a clock signal is propagated from another net through which a general signal other than the clock signal is propagated; and
eliminating the error criterion relating to the malfunction factors created in rising and falling signals propagated through the net through which the general signal is propagated.

8. The method of claim 7, further comprising ordering elimination of an error criterion from among a plurality of error criteria, which is included in another error criterion from among the plurality of error criteria.

9. The method of claim 8, further comprising:
transmitting data of a layout pattern of a logic circuit to be designed; and
simulating waveforms of the noise and the clock signal in the logic circuit.

10. The method of claim 7, further comprising:
selecting a signal that causes the victim receiver cell to operate from among the falling and rising signals; and
eliminating the error criterion relating to the malfunction factors generated in another signal that is different from the selected signal from among the falling and rising signals.

11. The method of claim 10, further comprising:
transmitting data of a layout pattern of a logic circuit to be designed; and
simulating waveforms of the noise and the clock signal in the logic circuit.

12. The method of claim 7, further comprising:
transmitting data of a layout pattern of a logic circuit to be designed; and
simulating waveforms of the noise and the clock signal in the logic circuit.

13. A system for analyzing noise comprising:
an error information storage unit storing threshold values of malfunction factors that create a malfunction of a victim receiver cell due to a noise;
an error criterion generation section configured to select the threshold values from the error information storage unit, and to generate an error criterion according to the victim receiver cell by plotting the threshold values and subjecting the threshold values to smooth processing;
a noise analysis section configured to measure the malfunction factors;
a comparison section configured to compare the measured malfunction factors to the error criterion, and to judge whether the noise will create a malfunction of the victim receiver cell when the malfunction factors meet the error criterion; and
a net analysis section configured to distinguish a net through which a clock signal is propagated from another net through which a general signal other than the clock signal is propagated and to order the error criterion generation section to eliminate the error criterion relating to the malfunction factors generated in rising and falling signals propagated through the net through which the general signal is propagated,
wherein the error information storage unit stores at least one of a noise voltage in the rising signal transmitted to the victim receiver cell, a noise duration in the rising signal transmitted to the victim receiver cell, a noise voltage in the falling signal transmitted to the victim receiver cell, a noise duration in the falling signal transmitted to the victim receiver cell, and the victim receiver cell load capacity as the threshold values.

14. The system of claim 13, further comprising an error criterion analysis section configured to analyze a plurality of error criteria, and to order to eliminate an error criterion from among a plurality of error criteria, which is included in another error criterion from among the plurality of error criteria.

15. The system of claim 13, further comprising a logic connection information analysis section configured to select a signal which causes the victim receiver cell to operate from among the falling and rising signals and to order the error criterion generation section to eliminate the error criterion relating to the malfunction factors created in another signal that is different from the signal selected from among the falling and rising signals.

16. The system of claim 13, further comprising:
a logic connection information input unit configured to transmit data to be designed for a layout pattern of a logic circuit; and
a simulation executing section configured to simulate waveforms of the noise and the clock signal in the logic circuit.

* * * * *